(12) United States Patent  
Takahashi

(10) Patent No.: US 11,417,080 B2  
(45) Date of Patent: Aug. 16, 2022

(54) OBJECT DETECTION APPARATUS, OBJECT DETECTION METHOD, AND COMPUTER-READABLE RECORDING MEDIUM

(71) Applicant: NEC CORPORATION, Tokyo (JP)

(72) Inventor: Katsuhiko Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 118 days.

(21) Appl. No.: 16/753,650

(22) PCT Filed: Oct. 6, 2017

(86) PCT No.: PCT/JP2017/036548  
§ 371 (c)(1),  
(2) Date: Apr. 3, 2020

(87) PCT Pub. No.: WO2019/069469  
PCT Pub. Date: Apr. 11, 2019

(65) Prior Publication Data  
US 2020/0242391 A1    Jul. 30, 2020

(51) Int. Cl.  
*G06V 10/32*       (2022.01)  
*G06V 20/58*       (2022.01)  
(Continued)

(52) U.S. Cl.  
CPC .............. *G06V 10/44* (2022.01); *G06V 10/32* (2022.01); *G06V 20/58* (2022.01)

(58) Field of Classification Search  
None  
See application file for complete search history.

(56) References Cited

U.S. PATENT DOCUMENTS

| 2005/0036054 A1* | 2/2005 | Mino | H04N 1/00204 |
|---|---|---|---|
| | | | 348/333.01 |
| 2013/0002809 A1* | 1/2013 | Shimizu | G06T 3/0062 |
| | | | 348/E7.001 |

(Continued)

FOREIGN PATENT DOCUMENTS

| JP | 2005-044196 A | 2/2005 |
|---|---|---|
| JP | 2009-093332 A | 4/2009 |

(Continued)

OTHER PUBLICATIONS

International Search Report for PCT/JP2017/036548 dated Dec. 12, 2017 (PCT/ISA/210).

(Continued)

*Primary Examiner* — Randolph I Chu

(57) ABSTRACT

An object detection apparatus 100 is provided with: a fish-eye image acquisition unit 10 configured to acquire a time series fish-eye image; a horizontal panorama image generation unit 20 configured to, for each frame, perform conversion to a horizontal panorama image in which a vertical direction in a real space is expressed in a perpendicular direction of the frame, and an azimuth is expressed equiangularly in a horizontal direction of the frame; an edge pair extraction unit 30 configured to extract a pair of edges in the perpendicular direction from the horizontal panorama image; a change rate extraction unit 40 configured to extract a change rate of an inter-edge distance between the pair of edges; a lower end region extraction unit 50 configured to extract a region of a lower end of an object providing the pair of edges; a distance change rate extraction unit 60 configured to calculate a distance from the object to the fish-eye camera based on the position of the region of the lower end of the object in the horizontal panorama image, and extract a change rate of the distance; and an object detection unit 70

(Continued)

configured to determine whether or not the object exists based on the change rate of the inter-edge distance and the change rate of the distance.

12 Claims, 13 Drawing Sheets

(51) Int. Cl.
*G06K 9/00* (2022.01)
*G06V 10/44* (2022.01)

(56) References Cited

U.S. PATENT DOCUMENTS

| | | | |
|---|---|---|---|
| 2014/0314336 A1 | 10/2014 | Yagi et al. | |
| 2014/0340473 A1* | 11/2014 | Artonne | H04N 5/23206 |
| | | | 348/36 |
| 2015/0092051 A1* | 4/2015 | Furukawa | G06T 7/194 |
| | | | 348/143 |
| 2016/0165136 A1* | 6/2016 | Mitsui | H04N 5/23229 |
| | | | 348/36 |
| 2016/0300323 A1* | 10/2016 | Nakagawa | G06T 3/0062 |
| 2017/0195561 A1* | 7/2017 | Hegelich | G06V 30/194 |
| 2017/0195564 A1* | 7/2017 | Appia | H04N 5/247 |
| 2018/0286075 A1* | 10/2018 | Jones | G06F 3/041 |
| 2019/0156131 A1* | 5/2019 | Akiyama | G06T 7/00 |
| 2021/0326608 A1* | 10/2021 | Yoshimi | G06T 7/73 |

FOREIGN PATENT DOCUMENTS

| | | |
|---|---|---|
| JP | 2011-210087 A | 10/2011 |
| JP | 2013-127739 A | 6/2013 |
| JP | 2016-162436 A | 9/2016 |

OTHER PUBLICATIONS

Written Opinion dated Dec. 12, 2017, from the International Searching Authority in International Application No. PCT/JP2017/036548.

* cited by examiner

FISH-EYE IMAGE

HORIZONTAL PANORAMA IMAGE

OBJECT DETECTION APPARATUS, OBJECT DETECTION METHOD, AND COMPUTER-READABLE RECORDING MEDIUM

CROSS REFERENCE TO RELATED APPLICATIONS

This application is a National Stage of International Application No. PCT/JP2017/036548 filed Oct. 6, 2017, the disclosure of which is incorporated herein in its entirety by reference.

TECHNICAL FIELD

The present invention relates to an object detection apparatus and an object detection method for detecting an object from an image obtained by a fish-eye camera, and further relates to a computer-readable recording medium where a program for realizing these is recorded.

BACKGROUND ART

In recent years, there have been disclosed several apparatuses configured to detect an object that exists in the vicinity of a vehicle based on an image from a camera installed in the vehicle (hereinafter, referred to as an "in-vehicle camera") to assist a driver when the vehicle is parked (for example, see Patent Documents 1 to 3).

Specifically, Patent Document 1 discloses an apparatus configured to detect a road attachment, for example a road sign, based on a captured image from an in-vehicle camera. The apparatus disclosed in Patent Document 1 detects a column-shaped columnar region by counting the frequency of edge pixels arranged in a vertical direction in the captured image, and further detects a region with a specific color and a region with a specific shape in the image, and detects a target road sign based on each of the detected regions.

Patent Document 2 discloses an apparatus configured to detect an obstacle based on a captured image from an in-vehicle camera arranged so as to capture an image forward or rearward of a vehicle. The apparatus disclosed in Patent Document 2 extracts an edge image from a captured image, averages the extracted edge image with a previously extracted edge image, and, based on the averaged edge image, detects an obstacle located forward or rearward of the vehicle.

Patent Document 3 also discloses an apparatus configured to detect an object in the vicinity of a vehicle based on a captured image from an in-vehicle camera. However, in the apparatus disclosed in Patent Document 3, image conversion is performed on the captured image from the in-vehicle camera to generate an image captured from another camera viewpoint. Ordinarily, the mounting position of the in-vehicle camera differs depending on the vehicle type, and as a result the appearance of the object differs. Therefore, fundamentally, it is necessary to create an identification device for object detection for each vehicle type, which increases cost, but according to the apparatus disclosed in Patent Document 3, this increase in cost can be suppressed.

Therefore, by installing an apparatus according to Patent Documents 1 to 3 in a vehicle, when parking, an object in the vicinity of the vehicle is detected, so the driver can park with peace of mind, and also safety in the vicinity of the vehicle is secured.

LIST OF RELATED ART DOCUMENTS

Patent Documents

Patent Document 1: Japanese Patent Laid-Open Publication No. 2016-162436
Patent Document 2: Japanese Patent Laid-Open Publication No. 2005-44196
Patent Document 3: Japanese Patent Laid-Open Publication No. 2011-210087

SUMMARY OF INVENTION

Problems to be Solved by the Invention

However, with the apparatuses disclosed in above Patent Documents 1 to 3, there is the problem that it is difficult to detect a rod-shaped object such as a pole, which is likely to become an obstacle when parking, in a case where the apparatus is combined with a fish-eye camera. Installation of fish-eye cameras in vehicles in order to provide parking assistance has been advancing. This will be specifically described below.

First, its object detection using a camera installed at the front of a vehicle, as disclosed in Patent Documents 1 and 2 described above, it is common to detect an object using a straight edge in a captured image as a clue. Also, in the in-vehicle camera in this case, the lens has a comparatively narrow viewing angle, so there is little lens distortion, and the mounting angle is an angle close to horizontal. Therefore, it is easy to extract a straight vertical edge and a horizontal edge.

On the other hand, in a fish-eye camera, the viewing angle exceeds 180 degrees, and an image from the fish-eye camera includes a large amount of barrel-shaped distortion, such that a line segment that is essentially straight in a real space is observed to curve in the image. Therefore, in the apparatus, it is difficult to extract a vertical edge or a horizontal edge from a captured image.

In order to facilitate extraction of a vertical edge and a horizontal edge, it is conceivable to adopt processing to correct lens distortion as pre-processing, but an in-vehicle camera mounted in order to provide parking assistance often is installed such that an optical axis direction is oriented obliquely downward. Therefore, even if a conventional distortion correction method is adopted, as shown in FIGS. 11 and 12, only an image with a large amount of projective distortion can be obtained, so it is still difficult to extract a vertical edge and a horizontal edge. FIG. 11 shows an example of a rod-shaped object in a real space. In FIG. 11, reference numeral 201 denotes a rod-shaped object. FIG. 12 shows a state in which conventional distortion correction has been performed on a rod-shaped object whose image was captured with a fish-eye lens. In FIG. 12, reference numeral 301 denotes a pair of line segments indicating the outer shape of the rod-shaped object 201.

On the other hand, it is also possible to correct the distortion by virtually orienting the optical axis direction of the camera, which is oriented obliquely downward, in the horizontal direction. When such correction is performed, as shown in FIG. 13, the image of the rod-shaped object 201 is converted into a straight shape in the perpendicular direction. FIG. 13 shows an example of a captured image obtained by virtually setting the optical axis direction of the camera to the horizontal direction. However, in the correction shown in FIG. 13, even if the size of the image in the horizontal direction after image conversion is infinite, a field of view exceeding a viewing angle of 180 degrees cannot be expressed in one image, so this sort of correction is not suitable for an object detection apparatus installed in a vehicle.

Also, in the technology disclosed in Patent Document 3, an image that appears similar to an image when viewed from another camera viewpoint is generated by assuming the shape of an object and the position where the object exists in real space. Therefore, in order to perform image conversion using the technology disclosed in Patent Document 3, it is necessary to assume various existence positions of the object, and there is a problem that this requires trial and error.

An example object of the invention is to provide an object detection apparatus an object detection method, and a computer-readable recording medium that address the above-described problems, such that it is possible to easily detect a rod-shaped object from a captured image even in a case where a fish-eye camera was used.

Means for Solving the Problems

In order to achieve the example object described above, an object detection apparatus according to an example aspect of the invention includes:

a fish-eye image acquisition unit configured to acquire a time series fish-eye image output from a fish-eye camera;

a horizontal panorama image generation unit configured to, for each frame included in the time series fish-eye image, perform conversion to a horizontal panorama image in which a vertical direction in a real space is expressed in a perpendicular direction of the frame, and an azimuth is expressed equiangularly in a horizontal direction of the frame;

an edge pair extraction unit configured to extract, for each frame, a pair of edges in the perpendicular direction from the horizontal panorama image;

a change rate extraction unit configured to extract, between the frames, a change rate of an inter-edge distance between the pair of edges extracted;

a lower end region extraction unit configured to extract, for each frame, a region that corresponds to a lower end of an object predicted to be providing the pair of edges;

a distance change rate extraction unit configured to calculate, for each frame, a distance from the object to the fish-eye camera based on the position of the region that corresponds to the lower end of the object in the horizontal panorama image, and extract, between the frames, a change rate of the distance from the object to the fish-eye camera; and an object detection unit configured to determine whether or not the object exists based on the change rate of the inter-edge distance and the change rate of the distance from the object to the fish-eye camera that were extracted.

Also, in order to achieve the example object described above, an object detection method according to an example aspect of the invention includes:

(a) a step of acquiring a time series fish-eye image output from a fish-eye camera;

(b) a step of, for each frame included in the time series fish-eye image, performing conversion to a horizontal panorama image in which a vertical direction in a real space is expressed in a perpendicular direction of the frame, and an azimuth is expressed equiangularly it a horizontal direction of the frame;

(c) a step of extracting, for each frame, a pair of edges in the perpendicular direction from the horizontal panorama image;

(d) a step of extracting, between the frames, a change rate of an inter-edge distance between the pair of edges extracted;

(e) a step of extracting, for each frame, a region that corresponds to a lower end of an object predicted to be providing the pair of edges;

(f) a step of calculating, for each frame, a distance from the object to the fish-eye camera based on the position of the region that corresponds to the lower end of the object in the horizontal panorama image, and extracting, between the frames, a change rate of the distance from the object to the fish-eye camera; and (g) a step of determining whether or not the object exists based on the change rate of the inter-edge distance and the change rate of the distance from the object to the fish-eye camera that were extracted.

Furthermore, in order to achieve the example object described above, a computer-readable recording medium according to an example aspect of the invention includes a program recorded thereon, the program including instructions that cause a computer to carry out:

(a) a step of acquiring a time series fish-eye image output from a fish-eye camera:

(b) a step of, for each frame included in the time series fish-eye image, performing conversion to a horizontal panorama image in which a vertical direction in a real space is expressed in a perpendicular direction of the frame, and an azimuth is expressed equiangularly in a horizontal direction of the frame;

(c) a step of extracting, for each frame, a pair of edges in the perpendicular direction from the horizontal panorama image;

(d) a step of extracting, between the frames, a change rate of an inter-edge distance between the pair of edges extracted;

(e) a step of extracting, for each frame, a region that corresponds to a lower end of an object predicted to be providing the pair of edges;

(f) a step of calculating, for each frame, a distance from the object to the fish-eye camera based on the position of the region that corresponds to the lower end of the object in the horizontal panorama image, and extracting, between the frames, a change rate of the distance from the object to the fish-eye camera; and (g) a step of determining whether or not the object exists based on the change rate of the inter-edge distance and the change rate of the distance from the object to the fish-eye camera that were extracted.

Advantageous Effects of the Invention

As described above, according to the invention, it is possible to easily detect a rod-shaped object from a captured image even in a case where a fish-eye camera was used.

EXAMPLE EMBODIMENT

Example Embodiment

Following is a description of an object detection apparatus, an object detection method, and a computer-readable recording medium according to an example embodiment of the invention, with reference to FIGS. 1 to 10.

[Apparatus Configuration]

Figure 1:
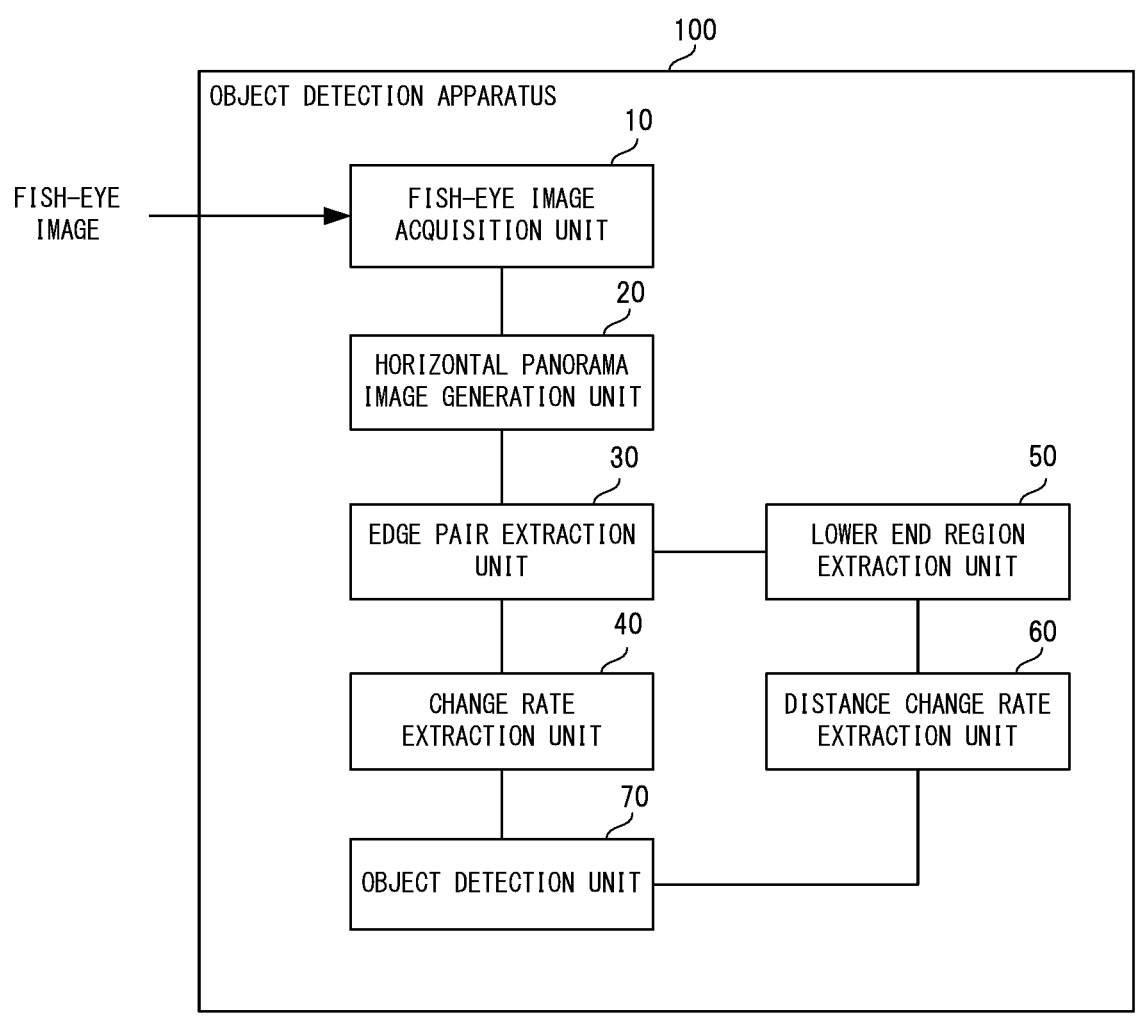
FIG. 1 is a block diagram showing a schematic configuration of an object detection apparatus according to an example embodiment of the invention.

First, the configuration of an object detection apparatus according to this example embodiment will be described. FIG. 1 is a block diagram showing a schematic configuration of an object detection apparatus according to an example embodiment of the invention.

As shown in FIG. 1, an object detection apparatus 100 according to this example embodiment is an apparatus for detecting an object from a time series fish-eye image output from a fish-eye camera. As shown in FIG. 1, the object detection apparatus 100 includes a fish-eye image acquisition unit 10, a horizontal panorama image generation unit 20, an edge pair extraction unit 30, a change rate extraction unit 40, a lower end region extraction unit 50, a distance change rate extraction unit 60, and an object detection unit 70.

The fish-eye image acquisition unit 10 is configured to acquire a time series fish-eye image output from a fish-eye camera. The horizontal panorama image generation unit 20 is configured to, for each frame included in the time series fish-eye image, perform conversion to a horizontal panorama image in which a vertical direction in a real space is expressed in a perpendicular direction of the frame, and an azimuth is expressed equiangularly in a horizontal direction of the frame.

The edge pair extraction unit 30 is configured to extract, for each frame, a pair of edges in the perpendicular direction from the horizontal panorama image. The change rate extraction unit 40 is configured to extract, between the frames, a change rate of an inter-edge distance between the pair of edges extracted (hereinafter referred to as the "pair of edges").

The lower end region extraction unit 50 is configured to extract, for each frame, a region that corresponds to a lower end of an object predicted to be providing the pair of edges. The distance change rate extraction unit 60 is configured to calculate, for each frame, a distance from the object to the fish-eye camera based on the position of the region that corresponds to the lower end of the object in the horizontal panorama image. Also, the distance change rate extraction unit 60 is configured to extract, between the frames, a change rate of the distance from the object to the fish-eye camera.

The object detection unit 70 is configured to determine whether or not the object exists based on the change rate of the inter-edge distance that was extracted by the change rate extraction unit 40, and the change rate of the distance from the object to the fish-eye camera that was extracted by the distance change rate extraction unit 60.

Thus, in this example embodiment, the horizontal panorama image in which the vertical direction in the real space is expressed in the perpendicular direction of the frame is generated from the fish-eye image output from the fish-eye camera. Therefore, the pair of edges in the perpendicular direction can easily be extracted. Also, in the horizontal panorama image, the azimuth is expressed equiangularly in the horizontal direction of the frame, so a visual field with a viewing angle of 180 degrees is also expressed by one image. Therefore, according to this example embodiment, it is possible to easily detect a rod-shaped object from a captured image even in a case where the fish-eye camera was used.

Figure 2:
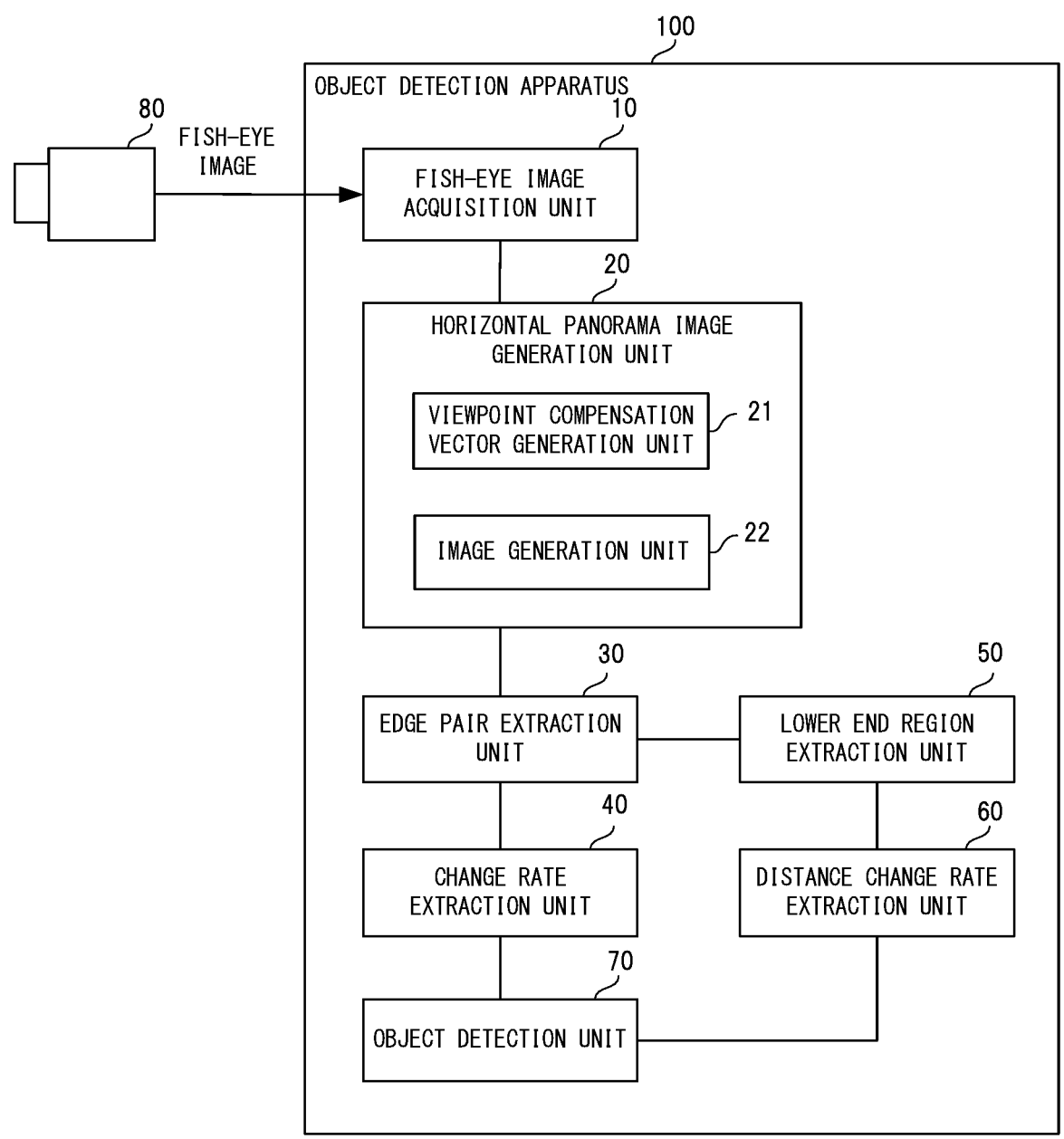
FIG. 2 is a block diagram more specifically showing the configuration of the object detection apparatus according to an example embodiment of the invention.

Next, the object detection device 100 according to this example embodiment will be described more specifically with reference to FIG. 2. FIG. 2 is a block diagram more specifically showing the configuration of the object detection apparatus according to an example embodiment of the invention.

As shown in FIG. 2, in this example embodiment, the object detection device 100 is connected to a fish-eye camera 80. The fish-eye camera 80 is an imaging device provided with a fish-eye lens system as an optical system. The fish-eye camera 80 outputs a captured image (a fish-eye image) at a frame rate that has been set. Also, the fish-eye camera 80, in a vehicle, enables detection of a rod-shaped object that exists its the vicinity of the vehicle, so the fish-eye camera 80 is disposed such that, in the vehicle, an optical axis direction is a direction inclined downward (a direction obliquely downward) in a vertical direction from a horizontal plane. Note that the fish-eye camera 80 may be disposed at any position in the vehicle.

The horizontal panorama image generation unit 20, in this example embodiment, generates an image (a horizontal panorama image) obtained by rotating a camera whose optical axis is oriented in the horizontal direction about 180 degrees in a horizontal plane from the image obtained by the fish-eye camera 80, which has a depression angle. Therefore, the horizontal panorama image generation unit 20 is provided with a viewpoint compensation vector generation unit 21 and an image generation unit 22.

The viewpoint compensation vector generation unit 21, based on a roll angle around the optical axis of the fish-eye camera 80 and a pitch angle of the optical axis with respect to a plane parallel to a ground plane of the object to be detected, generates a viewpoint compensation vector that converts the frame to an image obtained by capturing an image of the object from a direction parallel to the ground plane. Note that the roll angle and the pitch angle of the fish-eye camera 80 may be set values, or may be values acquired from a sensor installed in the vehicle.

Specifically, the viewpoint compensation vector generation unit 21 generates, as the viewpoint compensation vector, a relative vector between an optical axis vector of the fish-eye camera 80 and a vector parallel to the ground plane of the object. This relative vector is a vector that expresses rotation between two coordinate systems. Examples of a rotation expression method commonly include Quaternion expression, Euler angle expression, and the like. In this example embodiment, any expression method may be adopted.

First, the image generation unit 22, with respect to the frame that was converted using the viewpoint compensation vector, sets a plurality of viewpoints parallel to the ground plane in the horizontal direction of the frame. Also, for each of the viewpoints that was set, on the frame after conversion, based on a coordinate system that includes a sight line from each viewpoint as an axis, the image generation unit 22 performs distortion correction by perspective projection approximation. In addition, using an image element in the perpendicular direction extracted from each of the frames after correction, the image generation unit 22 generates one new frame, and adopts this as the horizontal panorama image.

Specifically, the image generation unit 22 first sets a set of parallelized viewpoints using a viewpoint compensation vector V with respect to the frame of the fish-eye image. Next, the image generation unit 22 arbitrarily divides the visual field range in the horizontal direction, and executes distortion correction by perspective projection approximation in each parallelized viewpoint coordinate system of each set of parallelized viewpoints (each parallelized viewpoint row). Then, the image generation unit 22 arranges image elements in a perpendicular direction passing through the center of each viewpoint in the horizontal direction in the order of the parallelized viewpoint rows, and by connecting these, generates a single composite image.

Figure 3:
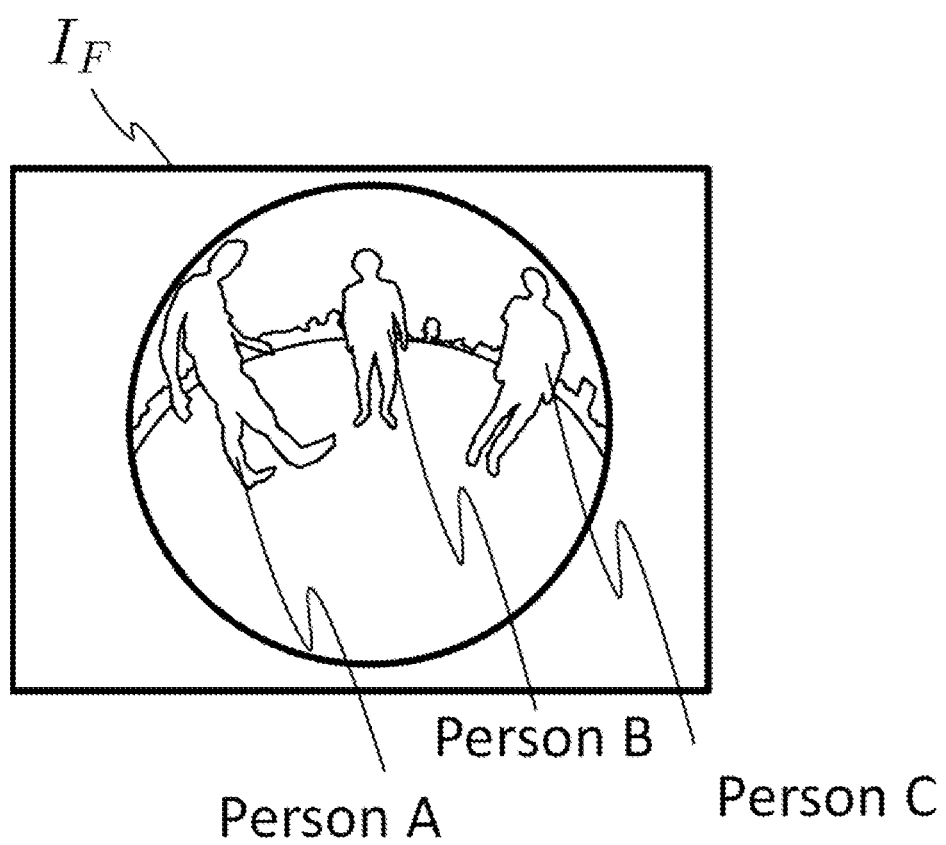
FIG. 3 schematically shows an example of a subject fish-eye image in an example embodiment of the invention.
Figure 4:
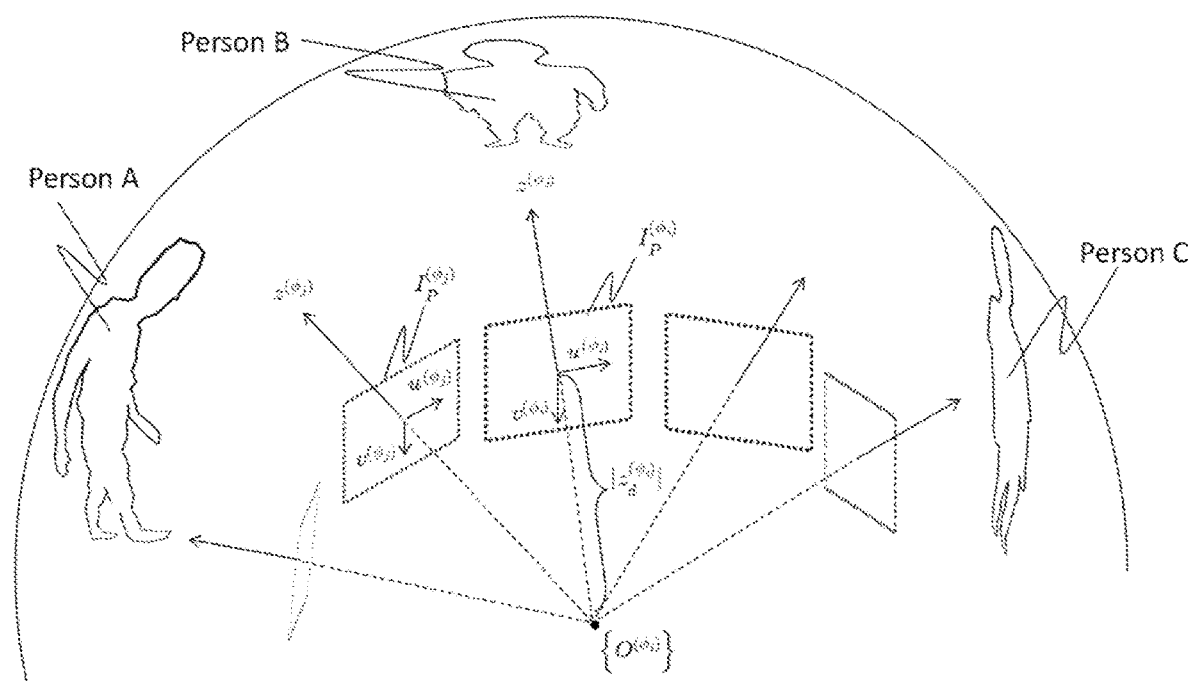
FIG. 4 shows an example of a parallelized viewpoint coordinate system defined in an example embodiment of the invention.
Figure 5:
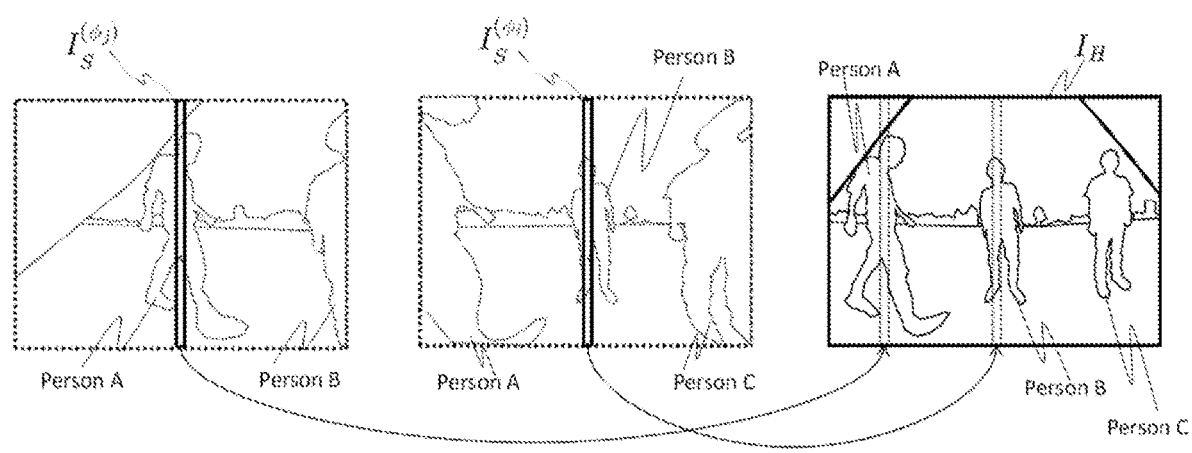
FIG. 5 shows two perspective projection corrected images with different parallelization viewpoints, and a horizontal panorama image obtained from the perspective projection corrected images.

Here, the processing of the image generation unit 22 will be described in more detail with reference to FIGS. 3 to 5. FIG. 3 schematically shows an example of a subject fish-eye image in an example embodiment of the invention. FIG. 4 shows an example of a parallelized viewpoint coordinate system defined in an example embodiment of the invention. FIG. 5 shows two perspective projection corrected images with different parallelization viewpoints, and a horizontal panorama image obtained from these perspective projection corrected images.

In the example of FIG. 3, a fish-eye image $I_F$ shows people (Person A, Person B, and Person C) image-captured from a downward-directed viewpoint with the ground used as the ground plane. As shown in FIG. 4, the image generation unit 22 sets a set of parallelized viewpoints $\varphi_n$ using the viewpoint compensation vector V, and further sets a parallelized viewpoint coordinate system for each parallelized viewpoint $\varphi_n$, and executes distortion correction by perspective projection approximation. Thus, a perspective projection corrected image $I_P^{(\varphi n)}$ is set for each parallelized viewpoint $\varphi_n$.

Note that n is a natural number indicating the number of parallelized viewpoints, and i and j in FIG. 4 indicate natural numbers of n or less. In FIG. 4, $O^{(\varphi n)}$ indicates a limit of the viewpoint compensation vector, and $z^{(\varphi n)}$ indicates the sight line that passes through each parallelized viewpoint. Also, $u^{(\varphi n)}$ and $v^{(\varphi n)}$ indicate respective axes the parallelized viewpoint coordinate system.

As shown in FIG. 5, the image generation unit 22 slices a central portion of the perspective projection corrected image $I_P^{(\varphi n)}$ in the vertical direction, and cuts out a slice image $I_S^{(\varphi n)}$. The slice image $I_S^{(\varphi n)}$ becomes a vertical image element that passes through the center of each viewpoint. Afterward, the image generation unit 22 combines the slice images $I_S^{(\varphi n)}$ into one frame. Thus, a final horizontal panorama image is generated.

Figure 6:
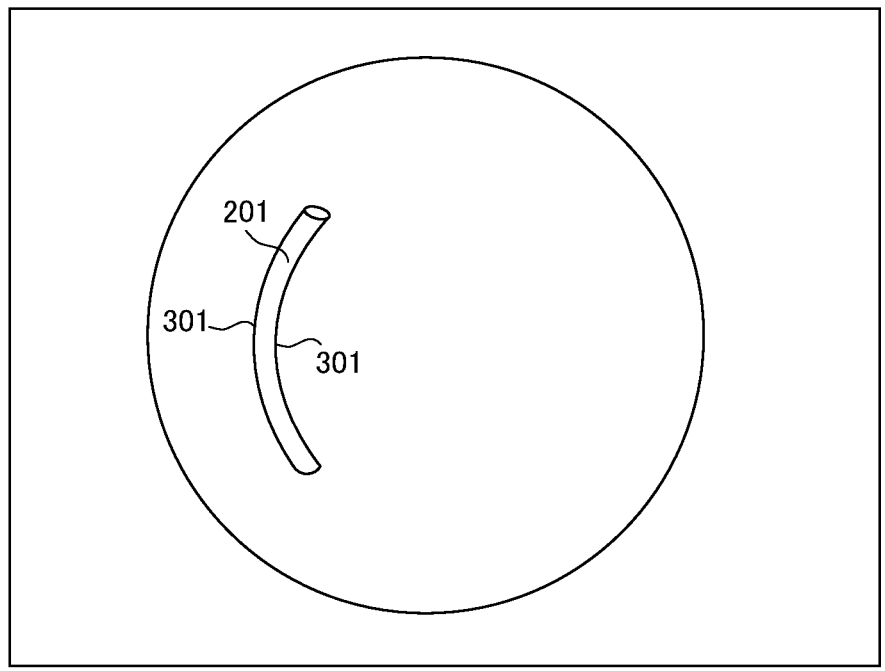
FIG. 6 shows an example of a fish-eye image to be processed and an example of a horizontal panorama image generated from that fish-eye image, in an example embodiment of the invention.
Figure 6:
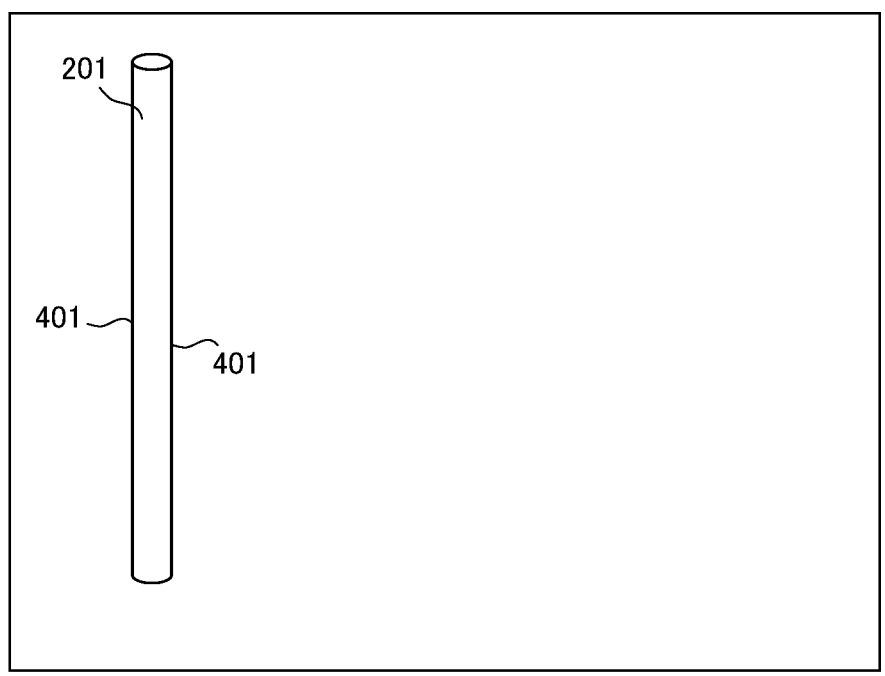
Figure 7:
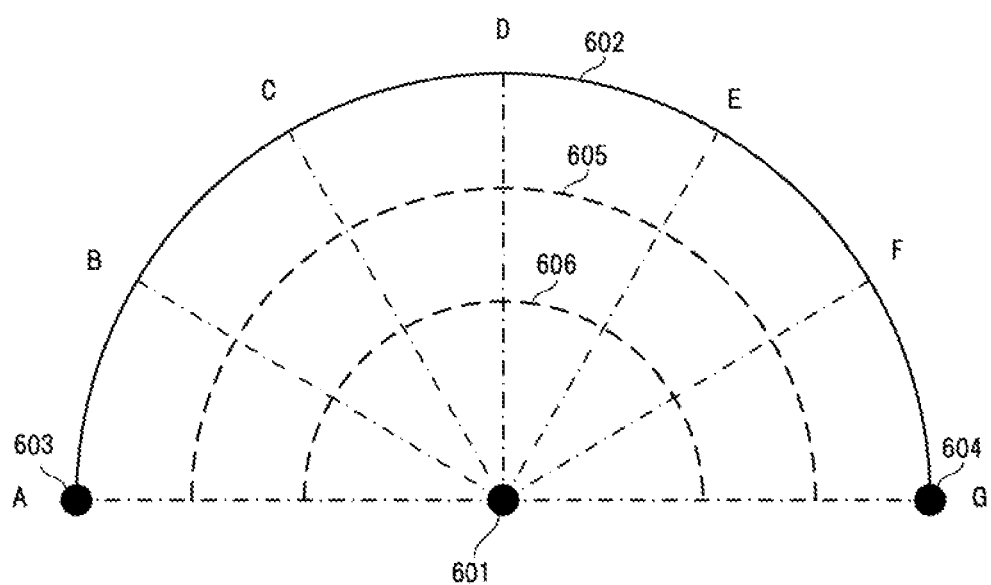
FIG. 7 shows a conceptual image obtained when an image of a real space captured using a fish-eye camera is viewed from above.
Figure 8:
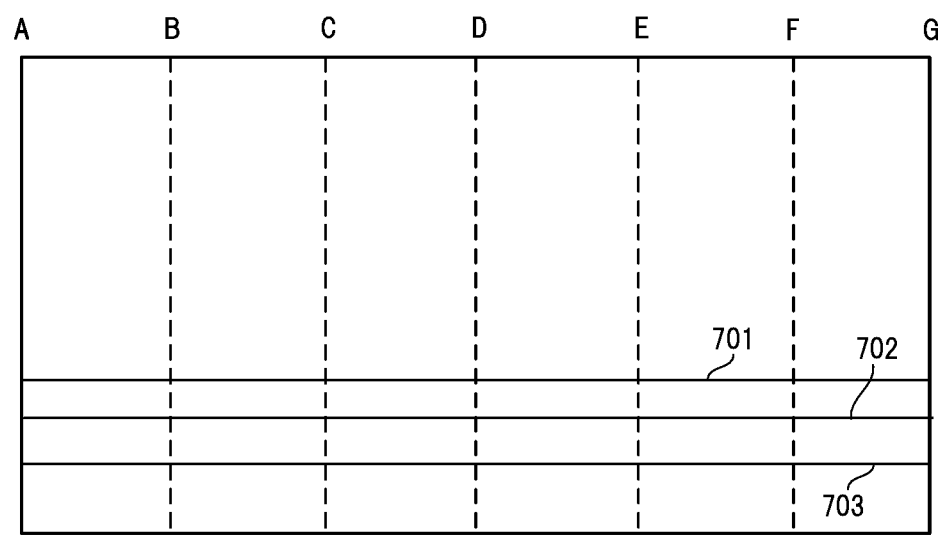
FIG. 8 shows a horizontal panorama image of the real space shown in FIG. 7.

The horizontal panorama image obtained in this way has the characteristic properties described in (1) to (3) below. Hereinafter, the characteristic properties (1) to (3) of the horizontal panorama image will be described with reference to FIGS. 6 to 8. FIG. 6 shows an example of a fish-eye image to be processed and an example of a horizontal panorama image generated from that fish-eye image, in an example embodiment of the invention. FIG. 7 shows a conceptual image obtained when an image of a real space captured using a fish-eye camera is viewed from above. FIG. 8 shows a horizontal panorama image of the real space shown in FIG. 7.

(1) As shown in FIG. 6, in the fish-eye image, an outer edge of a rod-shaped object 201 is observed as a pair of curved line segments 301. On the other hand, because the horizontal panorama image is generated by compositing the slice images $I_S^{(\varphi n)}$, the outer edge of the rod-shaped object 201 is observed as a pair of straight line segments 401 in the horizontal panorama image. In the horizontal panorama image, a line segment oriented in the vertical direction in the real space is converted into a line segment oriented in the perpendicular direction.

(2) In the horizontal panorama image, one image covers a wide field of view of a fish-eye image exceeding 180 degrees, and scale distortion in the horizontal direction is eliminated. Furthermore, an x-coordinate in the horizontal panorama image corresponds one-to-one with the camera azimuth when the camera is virtually rotated on a horizontal plane.

Specifically, as shown in FIG. 7, in a real space, a virtual circle 602 centered on an optical center 601 of the fish-eye camera 80 is assumed, and points A to G are assumed to exist at every 30 degrees from a position 603 at 9 o'clock to a position 604 at 3 o'clock on this virtual circumference. When a horizontal panorama image is generated from the fish-eye image in the real space shown in FIG. 7, the result is as shown in FIG. 8. That is, as shown in FIG. 8, the x-coordinates of the points A to G correspond one-to-one with the azimuth of the points A to G shown in FIG. 7, and each azimuth is equally allocated on the x-axis.

(3) The distance from the fish-eye camera 80 to the object in the real space (on a road plane coordinate system) corresponds one-to-one with the y-coordinate in the horizontal panorama image.

Specifically, as shown in FIG. 7, a virtual circle 605 and a virtual circle 606 centered on the optical center 601 are assumed. At this time, if the radii of the circle 602, the circle 605, and the circle 606 are r1, r2, and r3, respectively, a relationship of r1>r2>r3 is established. In this case, a point on the circumference of the circle 602, as shown in FIG. 8, in the horizontal panorama image, is located on a horizontal line 701. Similarly, a point on the circumference of the circle 605 is located on a horizontal line 702, and a point on the circumference of the circle 606 is located on a horizontal line 703. That is, the distance from the fish-eye camera to the object corresponds one-to-one with the y-coordinate in the horizontal panorama image.

Note that the relationship between the distance from the optical center 601 in the real space and the y-coordinate on the horizontal panorama image is uniquely determined depending on the internal parameters and external parameters of the fish-eye camera, the size of the horizontal panorama image, the resolution of the horizontal panorama image, and the like.

The processing by each of the edge pair extraction unit 30, the change rate extraction unit 40, the lower end region extraction unit 50, the distance change rate extraction unit 60, and the object detection unit 70 is performed by utilizing the characteristic properties of (1) to (3) above.

In this example embodiment, the edge pair extraction unit 30 applies edge extraction processing to the horizontal panorama image to extract an edge oriented in the perpendicular direction of the image. Furthermore, the edge pair extraction unit 30 also extracts another edge oriented in the perpendicular direction positioned near the extracted edge, sets both edges as a pair of edges, and outputs a rectangular region where the pair of edges exist.

An example of the edge pair extraction method is a method in which an edge pixel is obtained by applying a local edge extraction filter in an orthodox manner, and then a straight line extraction algorithm is applied. Another example is a method of directly obtaining the pixel position of a pair of edges using a neural network or the like. The edge pair extraction unit 30 can also extract a plurality of sets of edge pairs. In that case, the subsequent processing may be executed independently for each pair.

In this example embodiment, the change rate extraction unit 40 specifies the distance between edges of the edge pair extracted by the edge pair extraction unit 30 on a pixel-by-pixel basis in the image for each frame. Also, for example, a difference between the inter-edge distances in two frames is calculated, and a change rate of the inter-edge distance is extracted based on the calculated difference. Note that the difference between the inter-edge distances may also be calculated using three or more frames.

In this example embodiment, the lower end region extraction unit 50 searches the vicinity of a portion on the lower side of a screen of the rectangular boundary region output by the edge pair extraction unit 30, extracts a region that corresponds to the lower end of the rod-shaped object, and specifies the position of the extracted region.

Specifically, the lower end of the rod-shaped object usually has a specific shape such as a downwardly convex arc shape in the horizontal panorama image. Therefore, the lower end region extraction unit 50 first executes edge feature extraction in a peripheral region of the portion on the lower side of the screen of the rectangular region. Next, the lower end region extraction unit 50 executes sliding window processing with respect to the edge extracted by the edge feature extraction using a discriminator that has learned the shape of the lower end of the rod-shaped object in advance, and specifies an edge that corresponds to the lower end of the rod-shaped object, and specifies coordinates of the specified edge in the horizontal panorama image. Note that in a case where a value of certainty or similarity output from the discriminator does not exceed a predetermined threshold, the lower end region extraction unit 50 determines that the rod-shaped object does not exist.

In this example embodiment, the distance change rate extraction unit 60 first calculates the distance from the rod-shaped object to the fish-eye camera 80 based on the coordinates of the region that corresponds to the lower end of the rod-shaped object extracted by the lower end region extraction unit 50 in the horizontal panorama image.

Specifically, as shown in FIG. 7, the distance from the fish-eye camera 80 to the object corresponds to the y-coordinate in the horizontal panorama image on a one-to-one basis, and the relationship between this distance and the y-coordinate is uniquely determined. Therefore, the distance change rate extraction unit 60 uses the relationship between this distance and the y-coordinate to convert the coordinates of the region that corresponds to the lower end of the rod-shaped object in the horizontal panorama image to the distance from the fish-eye camera 80 to the object.

Also, the relationship between the distance from the fish-eye camera 80 to the object and the y-coordinate may be provided by, for example, a look-up table created by combining specific numerical values of the distance and the y-coordinate.

Next, the distance change rate extraction unit 60 calculates, with respect to frames extracted by the change rate extraction unit 40, between frames, the difference in distances from the fish-eye camera 80 to the rod-shaped object, and based on the calculated difference, extracts a change rate in the distance from the fish-eye camera 80 to the rod-shaped object. Note that, as described above, with respect to any of the frames to be extracted, when the lower end region extraction unit 50 has determined that the rod-shaped object does not exist, the distance change rate extraction unit 60 determines that a change rate of the distance cannot be extracted.

As described above, the object detection unit 70 determines whether or not the object exists based on the change rate of the distance between edge pairs and the change rate of the distance from the object to the fish-eye camera 80. This will be specifically described below.

First, the interval between the edge pairs is proportional to the azimuth difference between the side surfaces of the object that corresponds to the two edges, in other words, the angle. Also, there is a proportional relationship of $l = r \times \theta$ between the radius r of the arc, the central angle $\theta$, and the arc length l. Therefore, the arc length l is approximated to the diameter of the rod-shaped object, and the arc length l is considered to be universal. The center angle $\theta$ is replaced by an inter-edge interval w, and assuming that the pair of edges extracted by the change rate extraction unit 40 corresponds to both side surfaces of the truly rod-shaped object, the position extracted by the lower end region extraction unit 50 corresponds to the lower end of a truly rod-shaped object. In such a case, the change rate of the distance, between the edge pairs and the change rate of the distance from the object to the fish-eye camera 80 is expected to be inversely proportional.

Consequently, when the product of the change rate of the distance between the edge pairs and the change rate of the distance from the object to the fish-eye camera 80 falls within a predetermined range, the object detection unit 70, assuming that this pair of edges corresponds to the lower end of the rod-shaped object, determines that the rod-shaped object exists. Conversely, when the product of the change rate of the distance between the edge pairs and the change rate of the distance from the object to the fish-eye camera 80 does not fall within the predetermined range, if the position of the pair of edges or the lower end has not been found, the object detection unit 70 determines that the rod-shaped object does not exist.

[Apparatus Operation]

Figure 9:
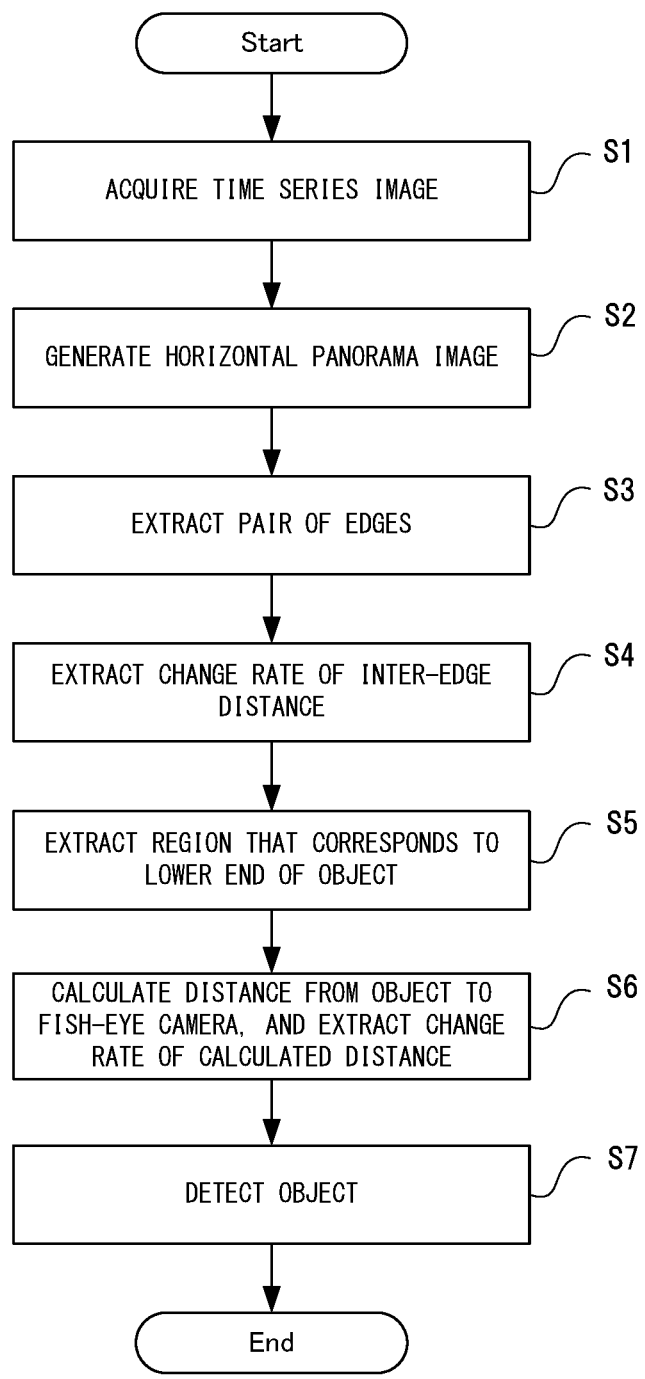
FIG. 9 is a flowchart showing operation of the object detection apparatus according to an example embodiment of the invention.

Next, operation of the object detection apparatus 100 according to this example embodiment will be described with reference to FIG. 9. FIG. 9 is a flowchart showing operation of the object detection apparatus according to an example embodiment of the invention. The following description refers to FIG. 1 as appropriate. Also, in this example embodiment, an object detection method is implemented by operating the object detection apparatus 100. Thus, the description of the object detection method in this example embodiment can be replaced with the description of operation of the object detection apparatus 100 below.

As shown in FIG. 9, first, the fish-eye image acquisition unit 10 acquires a time series fish-eye image output from the fish-eye camera 80, and inputs the acquired time series fish-eye image to the horizontal panorama image generation unit 20 (step S1).

Next, the horizontal panorama image generation unit 20 converts the time series fish-eye image acquired in step S1 to a horizontal panorama image, for each frame included in that fish-eye image (step S2).

Specifically, in step S2, the viewpoint compensation vector generation unit 21 first generates a viewpoint compensation vector. Next, with respect to the frame that was converted using the viewpoint compensation vector, the image generation unit 22 sets a plurality of viewpoints parallel to the ground plane in the horizontal direction of the frame. Then, the image generation unit 22, for each of the viewpoints that was set, on the frame after conversion, based on a coordinate system that includes a sight line from each viewpoint as an axis, performs distortion correction by perspective projection approximation. Furthermore, the image generation unit 22, using an image element in the perpendicular direction extracted from each of the frames after correction, generates one new frame, and adopts this as the horizontal panorama image.

Next, the edge pair extraction unit 30 extracts, for each frame, a pair of edges oriented in the perpendicular direction from the horizontal panorama image (step S3).

Next, the change rate extraction unit 40 specifies, for each frame, the inter-edge distance between the pair of edges extracted in step S3, and extracts a change rate of the inter-edge distance between the frames (step S4).

Next, the lower end region extraction unit 50 extracts, for each frame, a region that corresponds to the lower end of the object predicted to be providing the pair of edges, and specifies the position of the extracted region in the horizontal panorama image (Step S5).

Next, the distance change rate extraction unit 60 calculates, for each frame, the distance from the object to the fish-eye camera based on the position specified in step S5, and furthermore extracts, between the same frames as in step S4, the change rate of the distance from the object to the fish-eye camera 80 (step S6).

Afterward, the object detection unit 70 determines whether or not the object actually exists based on the change rate of the inter-edge distance that was extracted by step S4 and the change rate of the distance from the object to the fish-eye camera 80 that was extracted by step S6 (step S7).

Advantageous Effects of Example Embodiment

As described above, according to this example embodiment, it is possible to easily detect a rod-shaped object even in a case where a fish-eye camera was used. The reason for this is that, in the horizontal panorama image, an object that extends in the vertical direction in the real space is oriented in the perpendicular direction, and edges can be easily extracted. Also, in the horizontal panorama image, the change rate of the inter-edge distance in the edge pair and the change rate of the distance from the object to the fish-eye camera can be easily extracted, and based on the fact that there is a substantially inverse relationship between the two change rates, the existence or absence of the object can be determined.

Furthermore, in this example embodiment, by verifying the relationship between the change rate of the inter-edge distance of the edge pair and the change rate of the distance from the object to the fish-eye camera, it is possible to accurately determine whether or not the extracted edge pair was extracted from an actual rod-shaped object.

[Program]

A program according to this example embodiment may be a program that causes a computer to execute steps S1 to S7 shown in FIG. 9. By installing this program in the computer and executing the program, the object detection apparatus 100 and the object detection method according to this example embodiment can be realized. In this case, a processor of the computer performs processing to function as the fish-eye image acquisition unit 10, the horizontal panorama image generation unit 20, the edge pair extraction unit 30, the change rate extraction unit 40, the lower end region extraction unit 50, the distance change rate extraction unit 60, and the object detection unit 70. Also, a computer installed in an automobile can be given as a specific example of the computer, but in this example embodiment, the computer is not limited to that specific example. The computer may be a general-purpose computer, or, may be a computer installed in a home appliance, equipment for performing work, or the like.

Also, the program according to this example embodiment may be executed by a computer system constructed using a plurality of computers. In this case, for example, each computer may respectively function as any of the fish-eye image acquisition unit 10, the horizontal panorama image generation unit 20, the edge pair extraction unit 30, the change rate extraction unit 40, the lower end region extraction unit 50, the distance change rate extraction unit 60, and the object detection unit 70.

Figure 10:
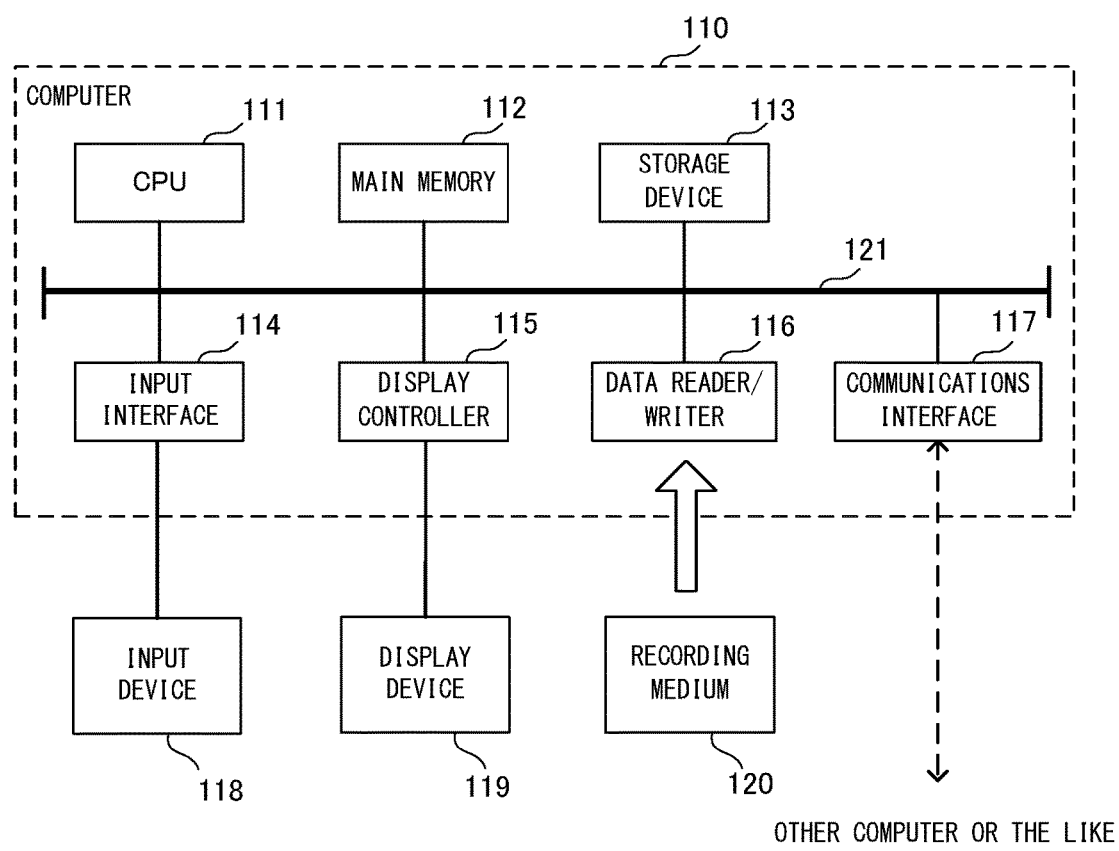
FIG. 10 is a block diagram showing an example of a computer that realizes the object detection apparatus according to an example embodiment of the invention.
Figure 11:
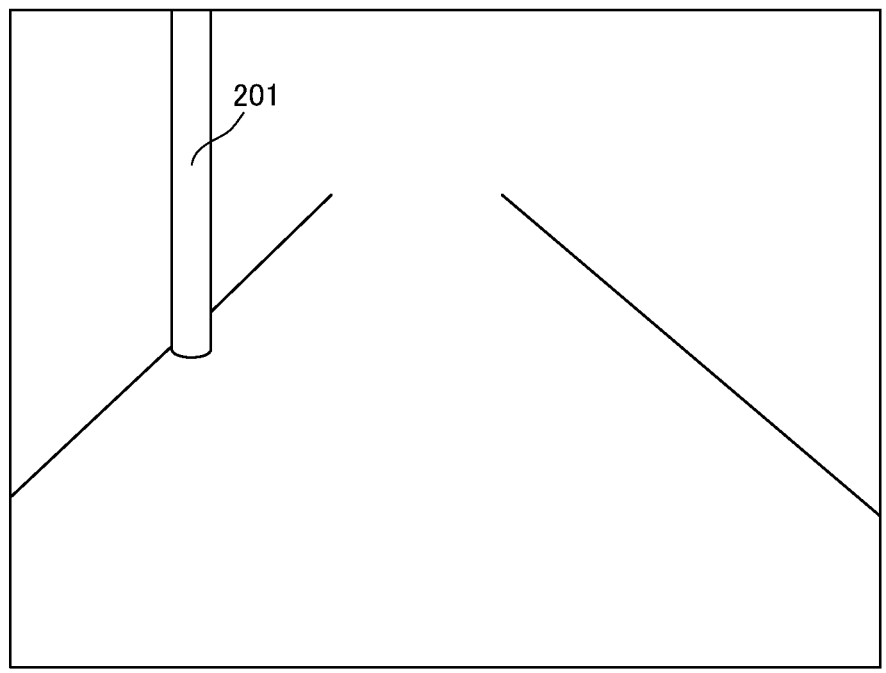
FIG. 11 shows an example of a rod-shaped object in a real space.
Figure 12:
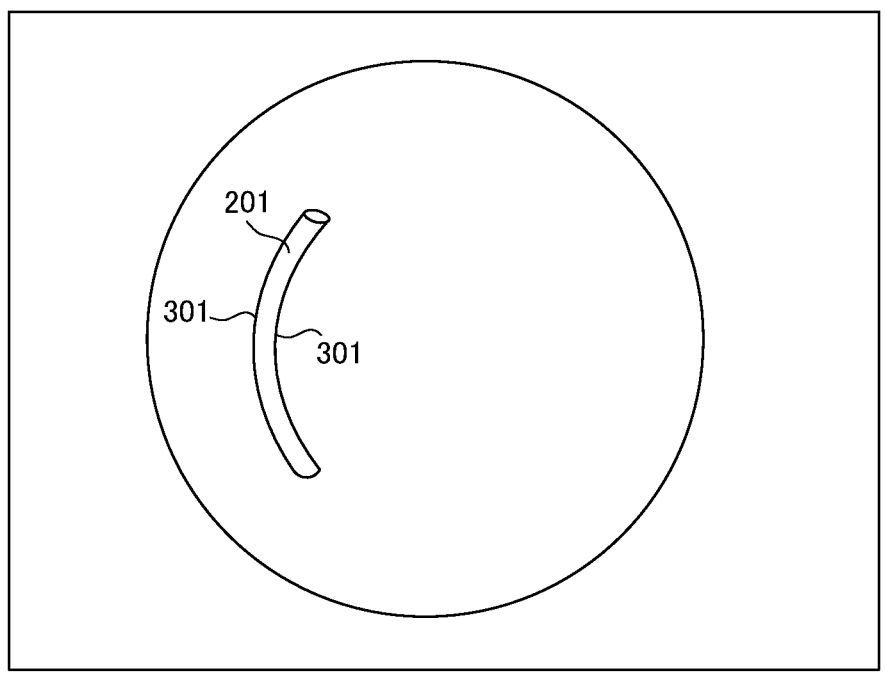
FIG. 12 shows a state in which conventional distortion correction has been performed on a rod-shaped object whose image was captured with a fish-eye lens.
Figure 13:
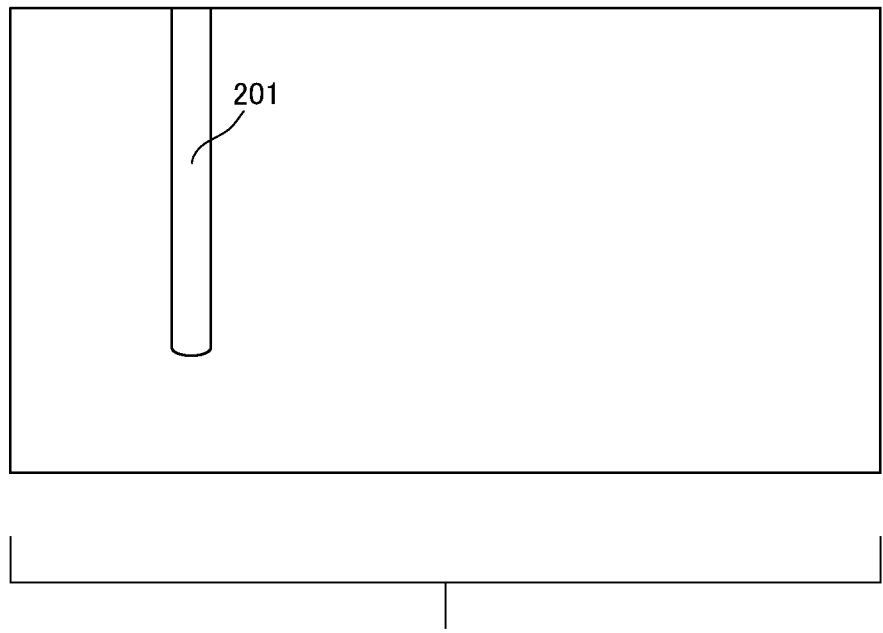
FIG. 13 shows an example of an image captured using a fish-eye lens, obtained by virtually setting an optical axis direction of a camera to the horizontal direction.

Here, a computer that realizes the object detection apparatus 100 by executing the program according to this example embodiment will be described with reference to FIG. 10. FIG. 10 is a block diagram showing an example of a computer that realizes the object detection apparatus according to an example embodiment of the invention.

As shown in FIG. 10, the computer 110 includes a CPU 111, a main memory 112, a storage device 113, an input interface 114, a display controller 115, a data reader/writer 116, and a communications interface 117. These units are each connected so as to be capable of performing data communications with each other through a bus 121.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the object detection apparatus 100 according to this example embodiment can also be realized by using hardware corresponding to each unit. Furthermore, a portion of the object detection apparatus 100 may be realized by a program, and the remaining portion realized by hardware.

Some portion or all of the example embodiments described above can be realized according to (supplementary note 1) to (supplementary note 12) described below, but the below description does not limit the invention.

(Supplementary Note 1)

An object detection apparatus, including:

a fish-eye image acquisition unit configured to acquire a time series fish-eye image output from a fish-eye camera;

a horizontal panorama image generation unit configured to, for each frame included in the time series fish-eye image, perform conversion to a horizontal panorama image in which a vertical direction in a real space is expressed in a perpendicular direction of the frame, and an azimuth is expressed equiangularly in a horizontal direction of the frame;

an edge pair extraction unit configured to extract, for each frame, a pair of edges in the perpendicular direction from the horizontal panorama image;

a change rate extraction unit configured to extract, between the frames, a change rate of an inter-edge distance between the pair of edges extracted;

a lower end region extraction unit configured to extract, for each frame, a region that corresponds to a lower end of an object predicted to be providing the pair of edges;

a distance change rate extraction unit configured to calculate, for each frame, a distance from the object to the fish-eye camera based on the position of the region that corresponds to the lower end of the object in the horizontal panorama image, and extract, between the frames, a change rate of the distance from the object to the fish-eye camera; and an object detection unit configured to determine whether or not the object exists based on the change rate of the inter-edge distance and the change rate of the distance from the object to the fish-eye camera that were extracted.

(Supplementary Note 2)

The object detection apparatus according to supplementary note 1, wherein the horizontal panorama image generation unit, based on a roll angle around an optical axis of the fish-eye camera and a pitch angle of the optical axis with respect to a plane parallel to a ground plane of the object, generates a viewpoint compensation vector that converts the frame to an image obtained by capturing an image of the object from a direction parallel to the ground plane, with respect to the frame that was converted using the acquired viewpoint compensation vector, sets a plurality of viewpoints parallel to the ground plane in the horizontal direction of the frame, for each of the viewpoints that was set, on the frame after conversion, based on a coordinate system that includes a sight line from the viewpoint as an axis, performs distortion correction by perspective projection approximation, and using an image element in the perpendicular direction extracted from each of the frames after correction, generates one new frame, and adopts this as the horizontal panorama image.

(Supplementary Note 3)

The object detection apparatus according to supplementary note 1 or 2, wherein the object detection unit determines that the object exists when there is an inverse relationship between the change rate of the inter-edge distance and the change rate of the distance from the object to the fish-eye camera.

(Supplementary Note 4)

The object detection apparatus according to any of supplementary notes 1 to 3, wherein the fish-eye camera is disposed such that, in a vehicle, the optical axis direction is a direction inclined downward in a vertical direction from a horizontal plane.

(Supplementary Note 5)

An object detection method, including:

(a) a step of acquiring a time series fish-eye image output from a fish-eye camera;

(b) a step of, for each frame included in the time series fish-eye image, performing conversion to a horizontal panorama image in which a vertical direction in a real space is expressed in a perpendicular direction of the frame, and an azimuth is expressed equiangularly in a horizontal direction of the frame;

(c) a step of extracting, for each frame, a pair of edges in the perpendicular direction from the horizontal panorama image;

(d) a step of extracting, between the frames, a change rate of an inter-edge distance between the pair of edges extracted;

(e) a step of extracting, for each frame, a region that corresponds to a lower end of an object predicted to be providing the pair of edges;

(f) a step of calculating, for each frame, a distance from the object to the fish-eye camera based on the position of the region that corresponds to the lower end of the object in the horizontal panorama image, and extracting, between the frames, a change rate of the distance from the object to the fish-eye camera; and (g) a step of determining whether or not the object exists based on the change rate of the inter-edge distance and the change rate of the distance from the object to the fish-eye camera that were extracted.

(Supplementary Note 6)

The object detection method according to supplementary note 5, wherein in the (b) step, based on a roll angle around an optical axis of the fish-eye camera and a pitch angle of the optical axis with respect to a plane parallel to a ground plane of the object, a viewpoint compensation vector that converts the frame to an image obtained by capturing an image of the object from a direction parallel to the ground plane is generated, with respect to the frame that was converted using the acquired viewpoint compensation vector, a plurality of viewpoints parallel to the ground plane in the horizontal direction of the frame are set, for each of the viewpoints that was set, on the frame after conversion, based on a coordinate system that includes a sight line from the viewpoint as an axis, distortion correction by perspective projection approximation is performed, and using an image element in the perpendicular direction extracted from each of the frames after correction, one new frame is generated, and this is adopted as the horizontal panorama image.

(Supplementary Note 7)

The object detection method according to supplementary note 5 or 6, wherein in the (g) step, it is determined that the object exists when there is an inverse relationship between the change rate of the inter-edge distance and the change rate of the distance from the object to the fish-eye camera.

(Supplementary Note 8)

The object detection method according to any of supplementary notes 5 to 7, wherein the fish-eye camera is disposed such that, in a vehicle, the optical axis direction is a direction inclined downward in a vertical direction from a horizontal plane.

(Supplementary Note 9)

A computer-readable recording medium that includes a program recorded thereon, the program including instructions that cause a computer to carry out:

(a) a step of acquiring a time series fish-eye image output from a fish-eye camera;

(b) a step of, for each frame included in the time series fish-eye image, performing conversion to a horizontal panorama image in which a vertical direction in a real space is expressed in a perpendicular direction of the frame, and an azimuth is expressed equiangularly in a horizontal direction of the frame;

(c) a step of extracting, for each frame, a pair of edges in the perpendicular direction from the horizontal panorama image;

(d) a step of extracting, between the frames, a change rate of an inter-edge distance between the pair of edges extracted;

(e) a step of extracting, for each frame, a region that corresponds to a lower end of an object predicted to be providing the pair of edges;

(f) a step of calculating, for each frame, a distance from the object to the fish-eye camera based on the position of the region that corresponds to the lower end of the object in the horizontal panorama image, and extracting, between the frames, a change rate of the distance from the object to the fish-eye camera; and (g) a step of determining whether or not the object exists based on the change rate of the inter-edge distance and the change rate of the distance from the object to the fish-eye camera that were extracted.

(Supplementary Note 10)

The computer-readable recording medium according to supplementary note 9, wherein in the (b) step, based on a roll angle around an optical axis of the fish-eye camera and a pitch angle of the optical axis with respect to a plane parallel to a ground plane of the object, a viewpoint compensation vector that converts the frame to an image obtained by capturing an image of the object from a direction parallel to the ground plane is generated, with respect to the frame that was converted using the acquired viewpoint compensation vector, a plurality of viewpoints parallel to the ground plane in the horizontal direction of the frame are set, for each of the viewpoints that was set, on the frame after conversion, based on a coordinate system that includes a sight line from the viewpoint as an axis, distortion correction by perspective projection approximation is performed, and using an image element in the perpendicular direction extracted from each of the frames after correction, one new frame is generated, and this is adopted as the horizontal panorama image.

(Supplementary Note 11)

The computer-readable recording medium according to supplementary note 9 or 10, wherein in the (g) step, it is determined that the object exists when there is an inverse relationship between the change rate of the inter-edge distance and the change rate of the distance from the object to the fish-eye camera.

(Supplementary Note 12)

The computer-readable recording medium according to any of supplementary notes 9 to 11, wherein the fish-eye camera is disposed such that, in a vehicle, the optical axis direction is a direction inclined downward in a vertical direction from a horizontal plane.

Although the invention is described above with reference to example embodiments, the invention is not limited by the above example embodiments. Within the scope of the invention, various modifications understandable by those skilled in the art can be made to the configurations or details of the invention.

INDUSTRIAL APPLICABILITY

As described above, according to the invention, it is possible to easily detect a rod-shaped object from a captured image even in a case where a fish-eye camera was used. The invention is useful in various fields where a fish-eye camera is used.

REFERENCE SIGNS LIST

10 Fish-eye image acquisition unit
20 Horizontal panorama image generation unit
21 Viewpoint compensation vector generation unit
22 Image generation unit
30 Edge pair extraction unit
40 Change rate extraction unit
50 Lower end region extraction unit
60 Distance change rate extraction unit
70 Object detection unit
100 Object detection apparatus
110 Computer
111 CPU
112 Main memory
113 Storage device
114 Input interface
115 Display controller
116 Data reader/writer
117 Communications interface
118 Input device
119 Display device
120 Recording medium
121 Bus
201 Rod-shaped object
301 Curved line segment in fish-eye image
401 Straight line segment in horizontal panorama image 601 Optical center (position where position of the fish-eye camera is projected on the ground in the vertical direction)
602, 605, 606 Virtual circles
603 Azimuth at 9 o'clock when viewed from the optical center
604 Azimuth at 3 o'clock when viewed from the optical center
605, 606 Examples of lines equidistant from the optical center
701, 702, 703 Horizontal lines

The invention claimed is:

1. An object detection apparatus, comprising:
a processor;
a memory device storing program code that the processor is to execute to function as:
a fish-eye image acquisition unit configured to acquire a time series fish-eye image output from a fish-eye camera;
a horizontal panorama image generation unit configured to, for each frame of a plurality of frames included in the time series fish-eye image, perform conversion to a horizontal panorama image in which a vertical direction in a real space is expressed in a perpendicular direction of the frame, and an azimuth is expressed equiangularly in a horizontal direction of the frame;
an edge pair extraction unit configured to extract, for each frame, a pair of edges in the perpendicular direction from the horizontal panorama image;
a change rate extraction unit configured to extract, between each adjacent pair of the frames, a change rate of an inter-edge distance between the pair of edges extracted for each frame of the adjacent pair;
a lower end region extraction unit configured to extract, for each frame, a region that corresponds to a lower end of an object predicted to be providing the pair of edges;
a distance change rate extraction unit configured to calculate, for each frame, a distance from the object to the fish-eye camera based on A position of the region that corresponds to the lower end of the object in the horizontal panorama image, and extract, between each adjacent pair of the frames, a change rate of the distance from the object to the fish-eye camera; and
an object detection unit configured to determine whether or not the object exists based on the change rate of the inter-edge distance and the change rate of the distance from the object to the fish-eye camera that were extracted.

2. The object detection apparatus according to claim 1, wherein the horizontal panorama image generation unit,
based on a roll angle around an optical axis of the fish-eye camera and a pitch angle of the optical axis with respect to a plane parallel to a ground plane of the object, generates a viewpoint compensation vector that converts one of the frames to an image obtained by capturing an image of the object from a direction parallel to the ground plane,
with respect to the one of the frames that was converted using the viewpoint compensation vector, sets a plurality of viewpoints parallel to the ground plane in the horizontal direction of the one of the frames,
for each of the viewpoints that was set, on the one of the frames after the conversion, based on a coordinate system that includes a sight line from the viewpoint as an axis, performs distortion correction by perspective projection approximation, and
using an image element in the perpendicular direction extracted from each of the frames after correction, generates one new frame, and adopts the one new frame as the horizontal panorama image.

3. The object detection apparatus according to claim 1, wherein the object detection unit determines that the object exists when there is an inverse relationship between the change rate of the inter-edge distance and the change rate of the distance from the object to the fish-eye camera.

4. The object detection apparatus according to claim 1, wherein the fish-eye camera is disposed such that, in a vehicle, an optical axis direction is a direction inclined downward in a vertical direction from a horizontal plane.

5. An object detection method, comprising:
acquiring a time series fish-eye image output from a fish-eye camera;
for each frame of a plurality of frames included in the time series fish-eye image, performing conversion to a horizontal panorama image in which a vertical direction in a real space is expressed in a perpendicular direction of the frame, and an azimuth is expressed equiangularly in a horizontal direction of the frame:
for each frame, a pair of edges in the perpendicular direction from the horizontal panorama image:
extracting, between each adjacent pair of the frames, a change rate of an inter-edge distance between the pair of edges extracted for each frame of the adjacent pair;
for each frame, a region that corresponds to a lower end of an object predicted to be providing the pair of edges;
for each frame, a distance from the object to the fish-eye camera based on a position of the region that corresponds to the lower end of the object in the horizontal panorama image, and extracting, between each adjacent pair of the frames, a change rate of the distance from the object to the fish-eye camera; and
determining whether or not the object exists based on the change rate of the inter-edge distance and the change rate of the distance from the object to the fish-eye camera that were extracted.

6. The object detection method according to claim 5, wherein in the performing of the conversion,
based on a roll angle around an optical axis of the fish-eye camera and a pitch angle of the optical axis with respect to a plane parallel to a ground plane of the object, a viewpoint compensation vector that converts one of the frames to an image obtained by capturing an image of the object from a direction parallel to the ground plane is generated,
with respect to the one of the frames that was converted using the viewpoint compensation vector, a plurality of viewpoints parallel to the ground plane in the horizontal direction of the frame are set,
for each of the viewpoints that was set, on the one of the frames after the conversion, based on a coordinate system that includes a sight line from the viewpoint as an axis, distortion correction by perspective projection approximation is performed, and
using an image element in the perpendicular direction extracted from each of the frames after correction, one new frame is generated, and this is adopted as the horizontal panorama image.

7. The object detection method according to claim 5, wherein in the determining, the object is determined to exist when there is an inverse relationship between the change rate of the inter-edge distance and the change rate of the distance from the object to the fish-eye camera.

8. The object detection method according to claim 5, wherein the fish-eye camera is disposed such that, in a vehicle, an optical axis direction is a direction inclined downward in a vertical direction from a horizontal plane.

9. A non-transitory computer-readable recording medium that includes a program recorded thereon, the program including instructions that cause a computer to carry out:
acquiring a time series fish-eye image output from a fish-eye camera:
for each frame of a plurality of frames included in the time series fish-eye image, performing conversion to a horizontal panorama image in which a vertical direction in a real space is expressed in a perpendicular direction of the frame, and an azimuth is expressed equiangularly in a horizontal direction of the frame;
extracting, for each frame, a pair of edges in the perpendicular direction from the horizontal panorama image;
extracting, between each adjacent pair of the frames, a change rate of an inter-edge distance between the pair of edges extracted for each frame of the adjacent pair;
extracting, for each frame, a region that corresponds to a lower end of an object predicted to be providing the pair of edges;
calculating, for each frame, a distance from the object to the fish-eye camera based on a position of the region that corresponds to the lower end of the object in the horizontal panorama image, and extracting, between each adjacent air of the frames, a change rate of the distance from the object to the fish-eye camera; and
determining whether or not the object exists based on the change rate of the inter-edge distance and the change rate of the distance from the object to the fish-eye camera that were extracted.

10. The non-transitory computer-readable recording medium according to claim 9,
wherein in the performing of the conversion,
based on a roll angle around an optical axis of the fish-eye camera and a pitch angle of the optical axis with respect to a plane parallel to a ground plane of the object, a viewpoint compensation vector that converts the frame to an image obtained by capturing an image of the object from a direction parallel to the ground plane is generated,
with respect to one of the frames that was converted using the viewpoint compensation vector, a plurality of viewpoints parallel to the ground plane in the horizontal direction of the frame are set,
for each of the viewpoints that was set, on the one of the frames after the conversion, based on a coordinate system that includes a sight line from the viewpoint as an axis, distortion correction by perspective projection approximation is performed, and
using an image element in the perpendicular direction extracted from each of the frames after correction, one new frame is generated, and this is adopted as the horizontal panorama image.

11. The non-transitory computer-readable recording medium according to claim 9,
wherein in the determining, the object is determined to exist when there is an inverse relationship between the change rate of the inter-edge distance and the change rate of the distance from the object to the fish-eye camera.

12. The non-transitory computer-readable recording medium according to claim 9,
wherein the fish-eye camera is disposed such that, in a vehicle, an optical axis direction is a direction inclined downward in a vertical direction from a horizontal plane.

* * * * *